US008484441B2

(12) United States Patent
Knowles

(10) Patent No.: US 8,484,441 B2
(45) Date of Patent: Jul. 9, 2013

(54) APPARATUS AND METHOD FOR SEPARATE ASYMMETRIC CONTROL PROCESSING AND DATA PATH PROCESSING IN A CONFIGURABLE DUAL PATH PROCESSOR THAT SUPPORTS INSTRUCTIONS HAVING DIFFERENT BIT WIDTHS

(75) Inventor: Simon Knowles, Bath (GB)

(73) Assignee: Icera Inc., Wilmington, DE (US)

( * ) Notice: Subject to any disclaimer, the term of this patent is extended or adjusted under 35 U.S.C. 154(b) by 326 days.

(21) Appl. No.: 10/813,433

(22) Filed: Mar. 31, 2004

(65) Prior Publication Data

US 2005/0223197 A1    Oct. 6, 2005

(51) Int. Cl.
*G06F 9/30*    (2006.01)
(52) U.S. Cl.
USPC .......................................................... 712/200
(58) Field of Classification Search
USPC ............. 712/1–9, 37, 15, 22, 24, 200; 326/39
See application file for complete search history.

(56) References Cited

U.S. PATENT DOCUMENTS

| | | | | |
|---|---|---|---|---|
| 4,228,498 A | * | 10/1980 | Moshier | ........................ 710/301 |
| 5,136,697 A | * | 8/1992 | Johnson | ........................ 712/239 |
| 5,423,051 A | | 6/1995 | Fuller et al. | |
| 5,600,801 A | | 2/1997 | Parks et al. | |
| 5,600,810 A | | 2/1997 | Ohkami | |
| 5,737,631 A | * | 4/1998 | Trimberger | ..................... 712/37 |
| 5,901,301 A | | 5/1999 | Matsuo et al. | |
| 5,922,065 A | * | 7/1999 | Hull et al. | ........................ 712/24 |
| 5,956,518 A | | 9/1999 | Dehon et al. | |
| 5,968,167 A | | 10/1999 | Whittaker et al. | |
| 6,044,450 A | | 3/2000 | Tsushima et al. | |
| 6,052,773 A | * | 4/2000 | DeHon et al. | ................... 712/43 |
| 6,061,367 A | | 5/2000 | Siemers | |
| 6,115,806 A | | 9/2000 | Yoshida | |
| 6,226,735 B1 | | 5/2001 | Mirsky | |
| 6,255,849 B1 | | 7/2001 | Mohan | |
| 6,292,845 B1 | | 9/2001 | Fleck et al. | |
| 6,526,430 B1 | | 2/2003 | Hung et al. | |

(Continued)

FOREIGN PATENT DOCUMENTS

| | | |
|---|---|---|
| EP | 419105 A2 * | 3/1991 |
| EP | 0789297 A2 | 8/1997 |

(Continued)

OTHER PUBLICATIONS

Haynes et al., "Configurable Multiplier Blocks for use within an FPGA", IEEE Trans. Computers, vol. 3, No. 1, 1998, 6 pages.*

(Continued)

*Primary Examiner* — David J Huisman

(57) ABSTRACT

A computer processor with control and data processing capabilities comprises a decode unit for decoding instructions. A data processing facility comprises a first data execution path including fixed operators and a second data execution path including at least configurable operators, the configurable operators having a plurality of predefined configurations, at least some of which are selectable by means of an opcode portion of a data processing instruction. The decode unit is operable to detect whether a data processing instruction defines a fixed data processing operation or a configurable data processing operation, said decode unit causing the computer system to supply data for processing to said first data execution path when a fixed data processing instruction is detected and to said configurable data execution path when a configurable data processing instruction is detected.

20 Claims, 3 Drawing Sheets

U.S. PATENT DOCUMENTS

| | | | |
|---|---|---|---|
| 6,721,884 | B1 | 4/2004 | De Oliveira Kastrup Pereira et al. |
| 6,725,357 | B1 | 4/2004 | Cousin |
| 6,798,239 | B2 * | 9/2004 | Douglass et al. .............. 326/39 |
| 6,880,150 | B1 | 4/2005 | Takayama et al. |
| 6,976,245 | B2 | 12/2005 | Takayama et al. |
| 6,976,250 | B2 | 12/2005 | Takayama et al. |
| 6,996,709 | B2 | 2/2006 | Arnold et al. |
| 7,039,790 | B1 | 5/2006 | Sima, Jr. et al. |
| 7,120,781 | B1 | 10/2006 | Kolagotla et al. |
| 7,159,099 | B2 | 1/2007 | Lucas et al. |
| 7,176,713 | B2 * | 2/2007 | Madurawe ..................... 326/38 |
| 7,234,042 | B1 | 6/2007 | Wilson |
| 7,237,089 | B2 | 6/2007 | Suzuki |
| 7,366,874 | B2 | 4/2008 | Seong et al. |
| 7,949,856 | B2 | 5/2011 | Knowles |
| 2002/0010852 | A1 | 1/2002 | Arnold et al. |
| 2002/0063577 | A1 | 5/2002 | Abbott |
| 2002/0089348 | A1 * | 7/2002 | Langhammer .................. 326/38 |
| 2002/0174266 | A1 * | 11/2002 | Palem et al. .................. 709/328 |
| 2002/0198606 | A1 | 12/2002 | Satou |
| 2003/0154258 | A1 | 8/2003 | Kakimoto |
| 2003/0154358 | A1 | 8/2003 | Seong et al. |
| 2004/0054876 | A1 | 3/2004 | Grisenthwaite et al. |
| 2004/0215593 | A1 | 10/2004 | Sharangpani et al. |
| 2005/0044434 | A1 | 2/2005 | Kahle et al. |
| 2005/0223193 | A1 | 10/2005 | Knowles |

FOREIGN PATENT DOCUMENTS

| | | | |
|---|---|---|---|
| EP | 1050810 | A1 | 8/2000 |
| EP | 1102163 | A2 | 5/2001 |
| JP | 5324430 | A | 12/1993 |
| JP | 09-212361 | | 8/1997 |
| JP | 9212361 | A | 8/1997 |
| JP | 9265397 | A | 10/1997 |
| JP | 11282674 | A | 10/1999 |
| JP | 2000509528 | T | 7/2000 |
| JP | 2001236496 | A | 8/2001 |
| JP | 2001306321 | A | 11/2001 |
| JP | 2002537599 | A | 11/2002 |
| JP | 2003005958 | A | 1/2003 |
| JP | 2003099397 | A | 4/2003 |
| JP | 2003-167728 | A | 6/2003 |
| JP | 2003-110604 | | 11/2003 |
| JP | 2004-309570 | | 11/2004 |
| JP | 2005531848 | T | 10/2005 |
| KR | 2003-0067892 | A | 8/2003 |
| TW | 516320 | B | 1/2003 |
| TW | 543000 | B | 7/2003 |
| TW | 559709 | B | 11/2003 |
| TW | 569138 | B | 1/2004 |
| TW | 200401187 | | 1/2004 |
| WO | WO 01/63923 | A1 | 8/2001 |

OTHER PUBLICATIONS

Lodi et al., "A Flexible LUT-Based Carry Chain for FPGAs", 2003, pp. 133-136.*

Jacob et al., "Memory Interfacing and Instruction Specification for Reconfigurable Processors", 1999, pp. 145-154.*

Bolotski, et al., "Unifying FPGAs and SIMD Arrays," M.I.T. Transit Project, Feb. 8, 1994, pp. 1-22, Transit Note #95.

Stokes, "A Brief Look at the PowerPC 970," Ars Technica, 2002, pp. 1-3.

Beebe, et al., "Instruction sequencing control," IBM Technical Disclosure Bulletin, May 1972, pp. 3599-3611, vol. 14, No. 12.

Simonen, et al., "Variable-Length Instruction Compression for Area Minimization," IEEE, 2003.

Tanenbaum, "Structured Computer Organization," 1984, pp. 10-12, Prentice-Hall, Inc., Englewood Cliffs, NJ.

Alippi, et al., "Determining the Optimum Extended Instruction-SetArchitecture for Application Specific Reconfigurable VLIW CPUs," IEEE, 2001, pp. 50-56.

International Search Report Issued in corresponding International Application No. PCT/GB2005/001073, dated Apr. 5, 2006.

Japanese Office Action; Feb. 22, 2011; 5 pages.

Related Japanese Office Action; Yasuhiko Murayama; Letter to Page White and Farrer; Office Action, Notice of Reasons for Rejection; Dated Mar. 11, 2011; 10 pages.

Cameron McNairy and Don Soltis; Itanium 2 Processor Microarchitecture; IEEE Computer Society; vol. 23 Issue 2; Mar.-Apr. 2003; pp. 2-14.

Intel; Intel Itanium Architecture Software Developer's Manual; vol. 1: Application Architecture, Revision 2.1; , Oct. 2002; Document No. 245317-004; 11 pages.

Translation Korean Office Action; Jong-Ik Lee; Korean Patent Application No. 10-2006-7020244; Transmittal Date, Jun. 20, 2011; "Apparatus and Method for Control Processing in Dual Path Processor"; 6 pages.

Translation Korean Office Action; Jong-Ik Lee; Korean Patent Application No. 10-2006-7020245; Transmittal Date, Jun. 23, 2011; "Apparatus and Method for Asymmetric Dual Path Processor"; 5 pages.

(No Author; "Encoding an Instruction Set"; Part 2.10; 4 pages) Paper is followed by Mike Johnson; "An Alternative to RISC: The Intel 80x86"; Elsevier Science (USA); 2003, 15 pages (Total 19 pages).

Translation of Japanese Office Action, JP Application No. 2007-505612, Mailing Date Mar. 13, 2012, 7 pages.

Translation of Taiwan First Office Action, TW Application No. 094109122, Date of Completion of Search Report Nov. 17, 2011, 12 pages.

PCT Search Report, Application No. PCT/GB2005/001069, Mailing Date Oct. 12, 2006, 8 pages.

PCT Search Report, Application No. PCT/GB2005/001059, Mailing Date May 19, 2006, 13 pages.

Taiwan Office Action dated Oct. 4, 2011 (english translation), 12 pages.

Japanese Office Action; Feb. 22, 2011 (english translation); 5 pages.

Simonen, P., et al., "Variable-Length Instruction Compression for Area Minimization," IEEE, 2003, 6 pages.

Translation of Taiwan Office Action, Taiwan Application No. 094109124, Feb. 1, 2013, 10 pages.

* cited by examiner

|   | C21 (ISSUED THIRD) | C21 (ISSUED SECOND) | C21 (ISSUED FIRST) | ─ 211 |
|---|---|---|---|---|
| 1 | | | | |

|   | D34 | | M28 | ─ 212 |
|---|---|---|---|---|
| 0 1 | | | | |

|   | D34 | RESERVED | C21 | ─ 213 |
|---|---|---|---|---|
| 0 0 | | | | |

FIG. 2

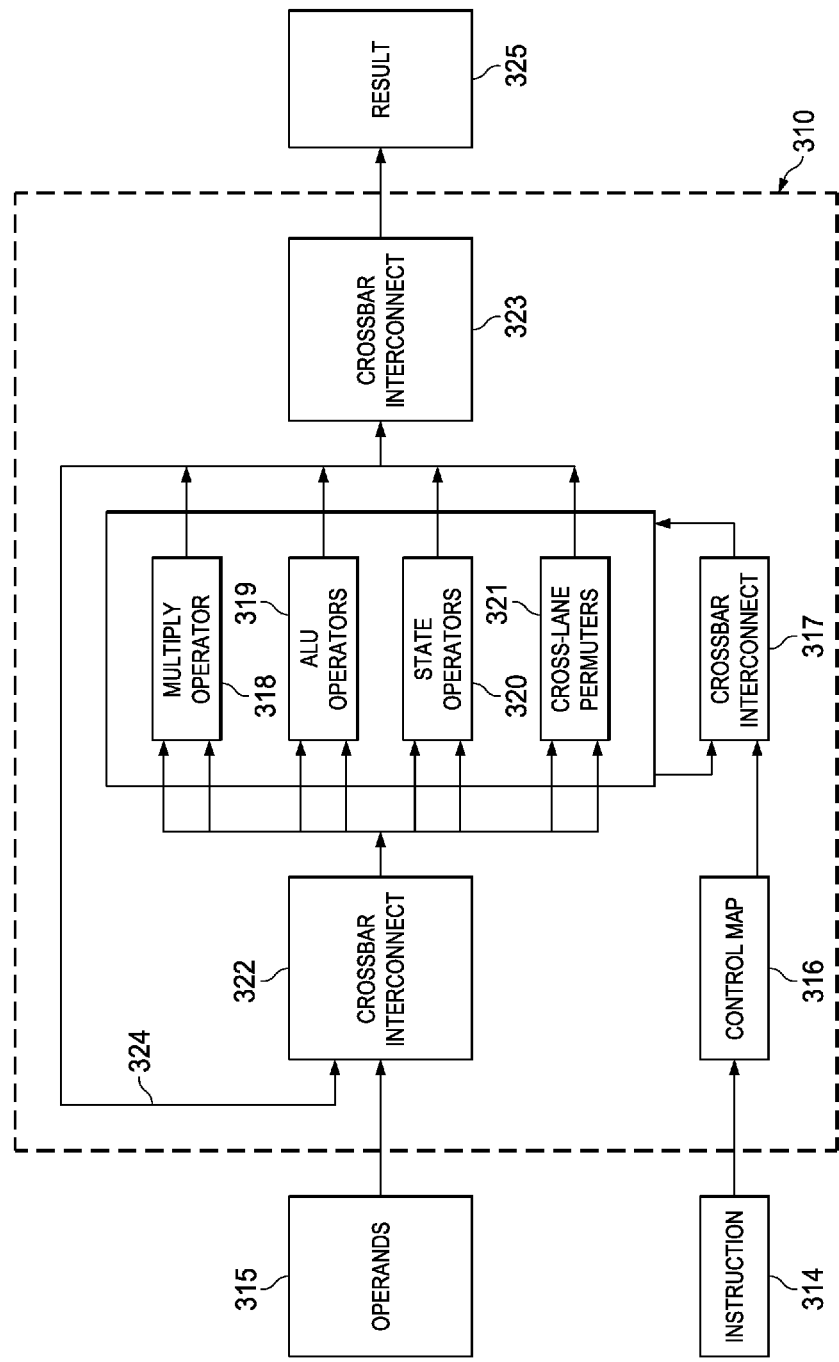

US 8,484,441 B2

APPARATUS AND METHOD FOR SEPARATE ASYMMETRIC CONTROL PROCESSING AND DATA PATH PROCESSING IN A CONFIGURABLE DUAL PATH PROCESSOR THAT SUPPORTS INSTRUCTIONS HAVING DIFFERENT BIT WIDTHS

TECHNICAL FIELD

This invention relates to a computer processor, a method of operating the same, and a computer program product comprising an instruction set for the computer.

BACKGROUND

In order to increase the speed of computer processors, prior art architectures have used dual execution paths for executing instructions. Dual execution path processors can operate according to a single instruction multiple data (SIMD) principle, using parallelism of operations to increase processor speed.

However, despite use of dual execution paths and SHAD processing, there is an ongoing need to increase processor speed. Typical dual execution path processors use two substantially identical channels, so that each channel handles both control code and datapath code. While known processors support a combination of 32-bit standard encoding and 16-bit "dense" encoding, such schemes suffer from several disadvantages, including a lack of semantic content in the few bits available in a 16-bit format.

Furthermore, conventional general purpose digital signal processors are not able to match application specific algorithms for many purposes, including performing specialized operations such as convolution, Fast Fourier Transforms, Trellis/Viterbi encoding, correlation, finite impulse response filtering, and other operations.

In one embodiment according to the invention, there is provided a computer processor having control and data processing capabilities. The computer processor comprises: a decode unit for decoding instructions; a data processing facility comprising a first data execution path including fixed operators and a second data execution path including at least configurable operators, said configurable operators having a plurality of predefined configurations, at least some of which are selectable by means of an opcode portion of a data processing instruction; wherein said decode unit is operable to detect whether a data processing instruction defines a fixed data processing operation or a configurable data processing operation, said decode unit causing the computer system to supply data for processing to said first data execution path when a fixed data processing instruction is detected and to said configurable data execution path when a configurable data processing instruction is detected.

In further related embodiments, the decode unit may be capable of decoding a stream of instruction packets from memory, each packet comprising a plurality of instructions. The decode unit may also be operable to detect if an instruction packet contains a data processing instruction. The configurable operators may be configurable at the level of multibit values, including multibit values comprising four or more bits, or at the level of words. A plurality of the fixed operators of the first data execution path may be arranged to perform a plurality of fixed operations in independent lanes according to single instruction multiple data principles. Also, a plurality of configurable operators of the second data execution path may be arranged to perform multiple operations in different lanes according to single instruction multiple data principles.

In other related embodiments, configurable operators of the second execution path may be arranged to receive configuration information which determines the nature of the operations performed. This information may be received from a field of an instruction defining a configurable data processing operation. Configurable operators of the second execution path may be arranged to receive configuration information comprising information controlling relative interconnectivity. The computer processor may further comprise a control map associated with configurable operators of the second data execution path, said control map being operable to receive at least one configuration bit from a configurable data processing instruction and to provide configuration information to the configurable operators responsive thereto. The configuration information may determine the nature of the operations performed by said configurable operators; and control interconnectivity between two or more of said configurable operators.

In further related embodiments, configurable operators of the second execution path may be arranged to receive either configuration information determining the nature of an operation to be performed or configuration information controlling interconnectivity from a source other than a configurable data processing instruction. At least one configurable operator of the second data execution path may be capable of executing data processing instructions with an execution depth greater than two computations before returning results to a results store. The computer processor may comprise a switch mechanism for receiving data processing operands from a configurable data processing instruction and switching them as appropriate for supply to one or more of said configurable operators. The computer processor may also comprise a switch mechanism for receiving results from one or more of said configurable operators and switching the results as appropriate for supply to one or more of a result store and feed back loop. The computer processor may also comprise a plurality of control maps for mapping configuration bits received from configurable data processing instructions to configuration information for supply to configurable operators of the second data execution path. Also, the computer processor may comprise a switch mechanism for receiving configuration information from a control map and switching it as appropriate for supply to configurable operators of the second data execution path. The computer processor may also comprise configurable operators selected from one or more of: multiply accumulate operators; arithmetic operators; state operators; and cross-lane permuters. Also, the computer processor may comprise operators and an instruction set capable of performing one or more operations selected from: Fast Fourier Transforms; Inverse Fast Fourier Transforms; Viterbi encoding/decoding; Turbo encoding/decoding; and Finite Impulse Response calculations; and any other Correlations or Convolutions.

In another embodiment according to the invention, there is provided a method of operating a computer processor having control and data processing capabilities, said computer processor comprising a first data execution path including fixed operators and a second data execution path including configurable operators, said configurable operators having a plurality of predefined configurations, at least some of which are selectable by means of an opcode portion of a data processing instruction. The method comprises: decoding a plurality of instructions to detect whether at least one data processing instruction, of said plurality of instructions, defines a fixed data processing operation or a configurable data processing operation; causing the computer processor to supply data for processing to said first data execution path when a fixed data processing instruction is detected and to said configurable data execution path when a configurable data processing instruction is detected; and outputting the results.

In another embodiment according to the invention, there is provided a computer program product comprising program code means for causing a computer processor, said computer processor comprising a first data execution path including fixed operators and a second data execution path including configurable operators, said configurable operators having a plurality of predefined configurations, at least some of which are selectable by means of an opcode portion of a data processing instruction, to: decode a plurality of instructions to detect whether at least one data processing instruction, of said plurality of instructions, defines a fixed data processing operation or a configurable data processing operation; cause the computer processor to supply data for processing to said first data execution path when a fixed data processing instruction is detected and to said configurable data execution path when a configurable data processing instruction is detected; and output the results.

In a further embodiment according to the invention, there is provided a data processing instruction set comprising a first plurality of instructions having a field indicating a fixed type of data processing operation and a second plurality of instructions having a field indicating a configurable type of data processing operations.

In another embodiment according to the invention, there is provided a computer processor having a data execution path comprising configurable operators, wherein the configurable operators comprise a plurality of pre-defined groups of operator configurations, each group comprising operators from a separate operator class. The operator classes may comprise classes selected from one or more of: multiply accumulate operators; arithmetic operators; state operators; and permuters. Connections between operators selected from within each of the pre-defined groups of operator configurations may be capable of being configured by an opcode portion within an instruction executed by the computer processor. Also, connections between operators selected from more than one of the pre-defined groups of operator configurations may be capable of being configured by an opcode portion within an instruction executed by the computer processor.

Additional advantages and novel features of the invention will be set forth in part in the description which follows, and in part will become apparent to those skilled in the art upon examination of the following and the accompanying drawings; or may be learned by practice of the invention.

BRIEF DESCRIPTION OF THE DRAWINGS

For a better understanding of the present invention, and to show how the same may be carried into effect, reference will now be made, by way of example only, to the accompanying drawings, in which:

FIG. 2 shows exemplary classes of instructions for the processor of FIG. 1, according to an embodiment of the invention; and FIG. 3 is a schematic showing components of a configurable deep execution unit, in accordance with an embodiment of the invention.

DETAILED DESCRIPTION

Figure 1:
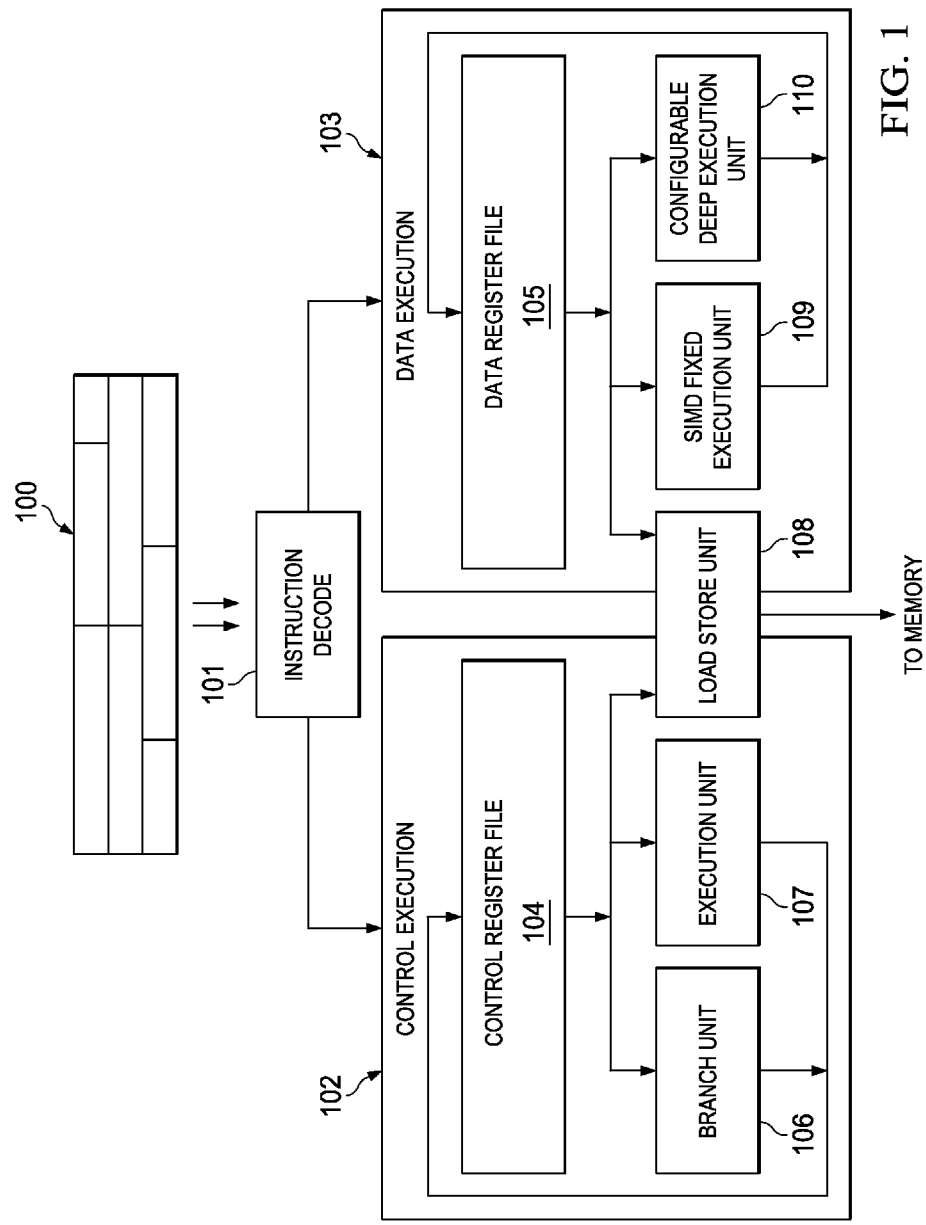
FIG. 1 is a block diagram of an asymmetric dual execution path computer processor, according to an embodiment of the invention.

FIG. 1 is a block diagram of an asymmetric dual path computer processor, according to an embodiment of the invention. The processor of FIG. 1 divides processing of a single instruction stream 100 between two different hardware execution paths: a control execution path 102, which is dedicated to processing control code, and a data execution path 103, which is dedicated to processing data code. The data widths, operators, and other characteristics of the two execution paths 102, 103 differ according to the different characteristics of control code and datapath code. Typically, control code favors fewer, narrower registers, is difficult to parallelize, is typically (but not exclusively) written in C code or another high-level language, and its code density is generally more important than its speed performance. By contrast, datapath code typically favors a large file of wide registers, is fly parallelizable, is written in assembly language, and its performance is more important than its code density. In the processor of FIG. 1, the two different execution paths 102 and 103 are dedicated to handling the two different types of code, with each side having its own architectural register file, such as control register file 104 and data register file 105, differentiated by width and number of registers; the control registers are of narrower width, by number of bits (in one example, 32-bits), and the data registers are of wider width (in one example, 64-bits). The processor is therefore asymmetric, in that its two execution paths are different bit-widths owing to the fact that they each perform different, specialised functions.

In the processor of FIG. 1, the instruction stream 100 is made up of a series of instruction packets. Each instruction packet supplied is decoded by an instruction decode unit 101, which separates control instructions from data instructions, as described further below. The control execution path 102 handles control-flow operations for the instruction stream, and manages the machine's state registers, using a branch unit 106, an execution unit 107, and a load store unit 108, which in this embodiment is shared with the data execution path 103. Only the control side of the processor need be visible to a compiler, such as a compiler for the C, C++, or Java language, or another high-level language compiler. Within the control side, the operation of branch unit 106 and execution unit 107 is in accordance with conventional processor design known to those of ordinary skill in the art.

The data execution path 103 employs SIMD (single instruction multiple data) parallelism, in both a fixed execution unit 109 and a configurable deep execution unit 110. As will be described further below, the configurable deep execution unit 110 provides a depth dimension of processing, to increase work per instruction, in addition to the width dimension used by conventional SIMD processors.

If the decoded instruction defines a control instruction it is applied to the appropriate functional unit on the control execution path of the machine (e.g. branch unit 106, execution unit 107, and load/store unit 108). If the decoded instruction defines an instruction with either a fixed or configurable data processing operation it is supplied to the data processing execution path. Within the data instruction part of the instruction packet designated bits indicate whether the instruction is a fixed or configurable data processing instruction, and in the case of a configurable instruction further designated bits define configuration information. In dependence on the sub-type of decoded data processing instruction, data is supplied to either the fixed or the configurable execution sub-paths of the data processing path of the machine.

Herein, "configurable" signifies the ability to select an operator configuration from amongst a plurality of predefined ("pseudo-static") operator configurations. A pseudo-static configuration of an operator is effective to cause an operator (i) to perform a certain type of operation or (ii) to be interconnected with associated elements in a certain manner or (iii) a combination of (i) and (ii) above. In practice, a selected pseudo-static configuration may determine the behavior and interconnectivity of many operator elements at a time. It can also control switching configurations associated with the data path. In a preferred embodiment, at least some of the plurality of pseudo-static operator configurations are selectable by an operation code portion of a data processing instruction, as will be illustrated further below. Also in accordance with embodiments herein, a "configurable instruction" allows the performance of customized operations at the level of multibit values; for example, at the level of four or more bit multibit values, or at the level of words.

It is pointed out that both control and data processing instructions, performed on their respective different sides of the machine, can define memory access (load/store) and basic arithmetic operations. The inputs/operands for control operations may be supplied to/from the control register file 104, whereas the data/operands for data processing operations are supplied to/from the register file 105.

In accordance with an embodiment of the invention, at least one input of each data processing operation can be a vector. In this respect, the configurable operators and/or switching circuitry of the configurable data path can be regarded as configurable to perform vector operations by virtue of the nature of operation performed and/or interconnectivity therebetween. For example, a 64 bit vector input to a data processing operation may include four 16-bit scalar operands. Herein, a "vector" is an assembly of scalar operands. Vector arithmetic may be performed on a plurality of scalar operands, and may include steering, movement, and permutation of scalar elements. Not all operands of a vector operation need be vectors; for example, a vector operation may have both a scalar and at least one vector as inputs; and output a result that is either a scalar or a vector.

Herein, "control instructions" include instructions dedicated to program flow, and branch and address generation; but not data processing. "Data processing instructions" include instructions for logical operations, or arithmetic operations for which at least one input is a vector. Data processing instructions may operate on multiple data instructions, for example in SIMD processing, or in processing wider, short vectors of data elements. The essential functions of control instruction and data processing instructions just mentioned do not overlap; however, a commonality is that both types of code have logic and scalar arithmetic capabilities.

FIG. 2 shows three types of instruction packet for the processor of FIG. 1. Each type of instruction packet is 64-bits long. Instruction packet 211 is a 3-scalar type, for dense control code, and includes three 21-bit control instructions (c21). Instruction packets 212 and 213 are LIW (long instruction word) type, for parallel execution of datapath code. In this example each instruction packet 212, 213 includes two instructions but different numbers may be included if desired. Instruction packet 212 includes a 34-bit data instruction (d34) and a 28-bit memory instruction (m28); and is used for parallel execution of data-side arithmetic (the d34 instruction) with a data-side load-store operation (the m28 instruction). Memory-class instructions (m28) can be read from, or written to, either the control side or the data side of the processor, using addresses from the control side. Instruction packet 213 includes a 34-bit data instruction (d34) and a 21-bit control instruction (c21); and is used for parallel execution of data-side arithmetic (the d34 instruction) with a control-side operation (the c21 instruction), such as a control-side arithmetic, branching, or load-store operation.

Instruction decode unit 101 of the embodiment of FIG. 1 uses the initial identification bits, or some other designated identification bits at predetermined bit locations, of each instruction packet to determine which type of packet is being decoded. For example, as shown in FIG. 2, an initial bit "1" signifies that an instruction packet is of a scalar control instruction type, with three control instructions; while initial bits "0 1" and "0 0" signify instruction packets of type 212 and 213, with a data and memory instruction in packet 212 or a data and control instruction in packet 213. Having decoded the initial bits of each instruction packet, the decode unit 101 of FIG. 1 passes the instructions of each packet appropriately to either the control execution path 102 or the data execution path 103, according to the type of instruction packet.

In order to execute the instruction packets of FIG. 2, the instruction decode unit 101 of the processor of the embodiment of FIG. 1 fetches program packets from memory sequentially; and the program packets are executed sequentially. Within an instruction packet, the instructions of packet 211 are executed sequentially, with the 21-bit control instruction at the least significant end of the 64-bit word being executed first, then the next 21-bit control instruction, and then the 21-bit control instruction at the most-significant end. Within instruction packets 212 and 213, the instructions can be executed simultaneously (although this need not necessarily be the case, in embodiments according to the invention). Thus, in the program order of the processor of the embodiment of FIG. 1, the program packets are executed sequentially; but instructions within a packet can be executed either sequentially, for packet type 211, or simultaneously, for packet types 212 and 213. Below, instruction packets of types 212 and 213 are abbreviated as MD and CD-packets respectively (containing one memory and one data instruction; and one control instruction and one data instruction, respectively).

In using 21-bit control instructions, the embodiment of FIG. 1 overcomes a number of disadvantages found in processors having instructions of other lengths, and in particular processors that support a combination of 32-bit standard encoding for data instructions and 16-bit "dense" encoding for control code. In such dual 16/32-bit processors, there is a redundancy arising from the use of dual encodings for each instruction, or the use of two separate decoders with a means of switching between encoding schemes by branch, fetch address, or other means. This redundancy is removed by using a single 21-bit length for all control instructions, in accordance with an embodiment of the invention. Furthermore, use of 21-bit control instructions removes disadvantages arising from insufficient semantic content in a 16-bit "dense" encoding scheme. Because of insufficient semantic content, processors using a 16-bit scheme typically require some mix of design compromises, such as: use of two-operand destructive operations, with corresponding code bloat for copies; use of windowed access to a subset of the register file, with code bloat for spill/fill or window pointer manipulation; or frequent reversion to the 32-bit format, because not all operations can be expressed in the very few available opcode bits in a 16-bit format. These disadvantages are alleviated by use of 21-bit control instructions, in an embodiment of the invention.

A large variety of instructions may be used, in accordance with an embodiment of the invention. For example, instruction signatures may be any of the following, where C-format, M-format, and D-format signify control, memory access, and data format respectively:

| Instruction Signature | Arguments | Used By |
| --- | --- | --- |
| instr | Instruction has no arguments | C-format only |
| instr dst | Instruction has a single destination argument | C-format only |
| instr src0 | Instruction has a single source argument | C- or D-format only |
| instr dst, src0 | Instruction has single destination, single source argument | D- and M-format instructions |
| instr dst, src0, src1 | Instruction has a single destination argument and two source arguments | C-, D-, and M-format instructions |

Also in accordance with one embodiment of the invention, the C-format instructions all provide SISD (single instruction single data) operation, while the M-format and D-format instructions provide either SISD or SIMD operation. For example, control instructions may provide general arithmetic, comparison, and logical instructions; control flow instructions; memory loads and store instructions; and others. Data instructions may provide general arithmetic, shift, logical, and comparison instructions; shuffle, sort, byte extend, and permute instructions; linear feedback shift register instructions; and, via the configurable deep execution unit 110 (described further below), user-defined instructions. Memory instructions may provide memory loads and stores; copy selected data registers to control registers; copy broadcast control registers to data registers; and immediate to register instructions.

In accordance with an embodiment of the invention, the processor of FIG. 1 features a first, fixed data execution path and a second configurable data execution path. The first data path has a fixed SIMD execution unit split into lanes in a similar fashion to conventional SIMD processing designs. The second data path has a configurable deep execution unit 10. "Deep execution" refers to the ability of a processor to perform multiple consecutive operations on the data provided by a single issued instruction, before returning a result to the register file. One example of deep execution is found in the conventional MAC operation (multiply and accumulate), which performs two operations (a multiplication and an addition), on data from a single instruction, and therefore has a depth of order two. Deep execution may also be characterized by the number of operands input being equal to the number of results output; or, equivalently, the valency-in equals the valency-out. Thus, for example, a conventional two-operand addition, which has one result, is not an example of preferred deep execution, because the number of operands is not equal to the number of results; whereas convolution, Fast Fourier Transforms, Trellis/Viterbi encoding, correlators, finite impulse response filters, and other signal processing algorithms are examples of deep execution. Application-specific digital signal processing ASP) algorithms do perform deep execution, typically at the bit level and in a memory-mapped fashion. However, conventional register-mapped general purpose DSP's do not perform deep execution, instead executing instructions at a depth of order two at most, in the MAC operation. By contrast, the processor of FIG. 1 provides a register-mapped general purpose processor that is capable of deep execution of dynamically configurable word-level instructions at orders greater than two. In the processor of FIG. 1, the nature of the deep execution instruction (the graph of the mathematical function to be performed) can be adjusted/customised by configuration information in the instruction itself. In the preferred embodiment, format instructions contain bit positions allocated to configuration information. To provide this capability, the deep execution unit 110 has configurable execution resources, which means that operator modes, interconnections, and constants can be uploaded to suit each application. Deep execution adds a depth dimension to the parallelism of execution, which is orthogonal to the width dimension offered by the earlier concepts of SIMD and LIW processing; it therefore represents an additional dimension for increasing work-per-instruction of a general purpose processor.

FIG. 3 shows the components of a configurable deep execution unit 310, in accordance with an embodiment of the invention. As shown in FIG. 1, the configurable deep execution unit 110 is part of the data execution path 103, and may therefore be instructed by data-side instructions from the MD and CD-instruction packets 212 and 213 of FIG. 2. In FIG. 3, an instruction 314 and operands 315 are supplied to the deep execution unit 310 from instruction decode unit 101 and data register file 105 of FIG. 1. A multi-bit configuration code in the decoded instruction 314 is used to access a control map 316, which expands the multi-bit code into a relatively complex set of configuration signals for configuring operators of the deep execution unit. The control map 316 may, for example, be embodied as a look-up table, in which different possible multi-bit codes of the instruction are mapped to different possible operator configurations of the deep execution unit. Based on the result of consulting the look-up table of the control map 316, a crossbar interconnect 317 configures a set of operators 318-321 in whatever arrangement is necessary to execute the operator configuration indicated by the multi-bit instruction code. The operators may include, for example, a multiply operator 318, an arithmetic logic unit (ALU) operator 319, a state operator 320, or a cross-lane permuter 321. In one embodiment, the deep execution unit contains fifteen operators: one multiply operator 318B eight ALU operators 319, four state operators 320, and two cross-lane permuters 321; although other numbers of operators are possible. The operands 315 supplied to the deep execution unit may be, for example, two 16-bit operands; these are supplied to a second crossbar interconnect 322 which may supply the operands to appropriate operators 318-321. The second crossbar interconnect 322 also receives a feedback 324 of intermediate results from the operator 318-321, which may then in turn also be supplied to the appropriate operator 318-321 by the second crossbar interconnect 322. A third crossbar interconnect 323 multiplexes the results from the operators 318-321, and outputs a final result 325. Various control signals can be used to configure the operators; for example, control map 316 of the embodiment of FIG. 3 need not necessarily be embodied as a single look-up table, but may be embodied as a series of two or more cascaded look-up tables. An entry in the first look-up table could point from a given multi-bit instruction code to a second look-up table, thereby reducing the amount of storage required in each look-up table for complex operator configurations. For example, the first look-up table could be organized into libraries of configuration categories, so that multiple multi-bit instruction codes are grouped together in the first look-up table with each group pointing to a subsequent look-up table that provides specific configurations for each multi-bit code of the group.

In accordance with the embodiment of FIG. 3, the operators are advantageously pre-configured into various operator classes. In practice, this is achieved by a strategic level of hardwiring. An advantage of this approach is that it means that fewer predefined configurations need be stored, and that control circuitry can be simpler. For example, operators 318 are pre-configured to be in the class of multiply operators; operators 319 are pre-configured as ALU operators; operators 320 are preconfigured as state operators; and operators 321 are pre-configured as cross-lane permuters; and other pre-configured classes are possible. However, even though the classes of operators are pre-configured, there is nm-time flexibility for instructions to be able to arrange at least: (i) connectivity of the operators within each class; (ii) connectivity with operators from the other classes; (iii) connectivity of any relevant switching means; for the final arrangement of a specific configuration for implementing a given algorithm.

A skilled reader will appreciate that, while the foregoing has described what is considered to be the best mode and where appropriate other modes of performing the invention, the invention should not be limited to specific apparatus configurations or method steps disclosed in this description of the preferred embodiment. Those skilled in the art will also recognize that the invention has a broad range of applications, and that the embodiments admit of a wide range of different implementations and modifications without departing from the inventive concepts. In particular, exemplary bit widths mentioned herein are not intended to be limiting, nor is the arbitrary selection of bit widths referred to as half words, words, long, etc.

What is claimed:

1. A hardware computer processor having control and data processing capabilities, said computer processor comprising:
    a hardware decode unit for decoding instructions and operable to separate control instructions from data processing instructions thereby to supply all control instructions and no data processing instructions to a dedicated hardware control processing facility;
    the dedicated hardware control processing facility comprising a control execution path dedicated to processing only said control instructions, said control execution path having its own control register file of a first bit width for handling control instructions of a first bit width and functional units comprising a branch unit, a hardware execution unit, and a load/store unit; and
    a dedicated hardware data processing facility dedicated to processing said data processing instructions, said dedicated data processing facility separate from said dedicated control processing facility and having its own data register file separate from said control register file, said data register file having a second bit width for handling data processing instructions of a second bit width, said second bit width wider than the first bit width, said dedicated data processing facility comprising a first data execution path including fixed operators and a second data execution path including at least configurable operators and a controller, both of said first and second data execution paths separate from said control execution path and each other, wherein said configurable operators are pre-configured into a plurality of hardwired operator classes;
    wherein said decode unit is operable to supply one of said control instructions to one of said functional units and operable to detect whether one of said data processing instructions defines a fixed data processing instruction or a configurable data processing instruction, wherein said configurable data processing instruction indicates at least one operand to be processed and includes an opcode portion defining the operation to be carried out on the at least one operand, said decode unit causing the computer processor to supply said one of said data processing instructions to said first data execution path for processing when said fixed data processing instruction is detected and to said second data execution path for processing when said configurable data processing instruction is detected; and
    wherein said controller is operable to configure the connectivity of said configurable operators in accordance with configuration information provided in the opcode portion of said configurable data processing instruction, and wherein said configurable operators are arranged to receive said at least one operand.

2. A computer processor according to claim 1, wherein the decode unit is capable of decoding a stream of instruction packets from memory, each packet comprising a plurality of instructions.

3. A computer processor according to claim 1, wherein the decode unit is operable to detect if an instruction packet contains a data processing instruction.

4. A computer processor according to claim 1, wherein the configurable operators are configurable at the level of multibit values.

5. A computer system according to claim 4, wherein the configurable operators are configurable at the level of words.

6. A computer processor according to claim 1, wherein a plurality of the fixed operators of the first data execution path is arranged to perform a plurality of fixed operations in independent lanes according to single instruction multiple data principles.

7. A computer processor according to claim 1, wherein a plurality of configurable operators of the second data execution path is arranged to perform multiple operations in different lanes according to single instruction multiple data principles.

8. A computer processor according to claim 1, wherein configurable operators of the second data execution path are arranged to receive configuration information which determines the nature of the operations performed.

9. A computer processor according to claim 8, wherein configurable operators of the second execution path are arranged to receive configuration information which determines the nature of the operations performed from said opcode portion of the configurable data processing instruction.

10. A computer processor according to claim 1, wherein interconnectivity between two or more of said configurable operators of the second data execution path is controlled by configuration information.

11. A computer processor according to claim 1, wherein at least one configurable operator of the second data execution path is capable of executing data processing instructions with an execution depth greater than two computations before returning results to a results store.

12. A computer processor according to claim 1, comprising a switch mechanism for receiving results from one or more of said configurable operators and switching the results as appropriate for supply to one or more of a result store and feed back loop.

13. A computer processor according to claim 1, comprising a plurality of control maps for mapping configuration bits received from configurable data processing instructions to configuration information for supply to configurable operators of the second data execution path.

14. A computer processor according to claim 1, comprising a switch mechanism for receiving configuration information from a control map and switching it as appropriate for supply to configurable operators of the second data execution path.

15. A computer processor according to claim 1, comprising configurable operators selected from one or more of: multiply accumulate operators; arithmetic operators; state operators; and cross-lane permuters.

16. A computer processor according to claim 1, comprising operators and an instruction set capable of performing one or more operations selected from: Fast Fourier Transforms; Inverse Fast Fourier Transforms; Viterbi encoding/decoding; Turbo encoding/decoding; and Finite Impulse Response calculations; and any other Correlations or Convolutions.

17. A method of operating a computer processor having control and data processing capabilities, said computer processor comprising a decode unit for decoding instructions; a dedicated control processing facility comprising a control execution path dedicated to processing only control instructions, said control execution path having its own control register file of a first bit width for handling control instructions of a first bit width and functional units comprising a branch unit, an execution unit, and a load/store unit; and a dedicated data processing facility dedicated to processing data processing instructions, said dedicated data processing facility separate from said dedicated control processing facility and having its own data register file separate from said control register file, said data register file having a second bit width for handling data processing instructions of a second bit width, said second bit width wider than the first bit width, said dedicated data processing facility comprising a first data execution path including fixed operators and a second data execution path including at least configurable operators and a controller, both of said first and second data execution paths separate from said control execution path and each other, wherein said configurable operators are pre-configured into a plurality of hardwired operator classes, the method comprising:
    separating, with said decode unit, control instructions from data processing instructions thereby supplying all control instructions and no data processing instructions to the dedicated control processing facility;
    supplying, by said decode unit, one of said control instructions to one of said functional units;
    decoding a plurality of instructions to detect whether at least one of said data processing instructions of said plurality of instructions defines a fixed data processing instruction or a configurable data processing instruction, wherein said configurable data processing instruction indicates at least one operand to be processed and includes an opcode portion defining the operation to be carried out on the at least one operand;
    causing the computer processor to supply said at least one of said data processing instructions to said first data execution path for processing when said fixed data processing instruction is detected and to said second data execution path for processing when said configurable data processing instruction is detected;
    configuring the connectivity of said configurable operators in accordance with configuration information provided in said opcode portion of said configurable data processing instruction, wherein said configurable operators are arranged to receive said at least one operand; and
    outputting results produced by said first data execution path when a fixed data processing instruction is detected and outputting results produced by said second data execution path when a configurable processing instruction is detected.

18. A hardware computer processor having control and data processing capabilities, said computer processor comprising:
    a hardware decode unit for decoding instructions and operable to separate control instructions from data processing instructions thereby to supply all control instructions and no data processing instructions to a dedicated hardware control processing facility;
    the dedicated hardware control processing facility comprising a control execution path dedicated to processing only said control instructions, said control execution path having its own control register file of a first bit width for handling control instructions of a first bit width and functional units, comprising a branch unit, a hardware execution unit, and a load/store unit;
    a dedicated hardware data processing facility dedicated to processing said data processing instructions, said dedicated data processing facility separate from said dedicated control processing facility and having its own data register file separate from said control register file, said data register file having a second bit width for handling data processing instructions of a second bit width, said second bit width wider than the first bit width, said dedicated data processing facility comprising a first data execution path including fixed operators and a second data execution path including at least configurable operators and a controller, both of said first and second data execution paths separate from said control execution path and each other, wherein said configurable operators are pre-configured into a plurality of hardwired operator classes; and
    a switch mechanism for receiving data processing operands from a configurable data processing instruction and switching them as appropriate for supply to one or more of said configurable operators;
    wherein said decode unit is operable to supply one of said control instructions to one of said functional units and operable to detect whether one of said data processing instructions defines a fixed data processing instruction or said configurable data processing instruction, wherein said configurable data processing instruction indicates at least one operand to be processed and includes an opcode portion defining the operation to be carried out on the at least one operand, said decode unit causing the computer processor to supply said one of said data processing instructions to said first data execution path for processing when said fixed data processing instruction is detected and to said second data execution path for processing when said configurable data processing instruction is detected; and
    wherein said controller is operable to configure the connectivity of said configurable operators in accordance with configuration information provided in the opcode portion of said configurable data processing instruction, and wherein said configurable operators are arranged to receive said at least one operand.

19. A hardware computer processor having control and data processing capabilities, said computer processor comprising:
    a hardware decode unit for decoding instructions and operable to separate control instructions from data processing instructions thereby to supply all control instructions and no data processing instructions to a dedicated hardware control processing facility;
    the dedicated hardware control processing facility comprising a control execution path dedicated to processing only said control instructions, said control execution path having its own control register file of a first bit width for handling control instruction of a first bit width and functional units comprising a branch unit, a hardware execution unit, and a load/store unit; and a dedicated hardware data processing facility dedicated to processing said data processing instructions, said dedicated data processing facility separate from said dedicated control processing facility and having its own data register file separate from said control register file, said data register file having a second bit width for handling data processing instructions of a second bit width, said second bit width wider than the first bit width, said dedicated data processing facility comprising a first data execution path including fixed operators and a second data execution path including at least configurable operators and a controller, both of said first and second data execution paths separate from said control execution path and each other, wherein said configurable operators are pre-configured into a plurality of hardwired operator classes, wherein said configurable operators are configurable at the level of multibit values comprising four or more bits;

wherein said decode unit is operable to supply one of said control instructions to one of said functional units and operable to detect whether one of said data processing instructions defines a fixed data processing instruction or a configurable data processing instruction, wherein said configurable data processing instruction indicates at least one operand to be processed and includes an opcode portion defining the operation to be carried out on the at least one operand, said decode unit causing the computer processor to supply said one of said data processing instructions to said first data execution path for processing when said fixed data processing instruction is detected and to said second data execution path for processing when said configurable data processing instruction is detected; and wherein said controller is operable to configure the connectivity of said configurable operators in accordance with configuration information provided in the opcode portion of said configurable data processing instruction, and wherein said configurable operators are arranged to receive said at least one operand.

20. A hardware computer processor having control and data processing capabilities, said computer processor comprising:

a hardware decode unit for decoding instructions and operable to separate control instructions from data processing instructions thereby to supply all control instructions and no data processing instructions to a dedicated hardware control processing facility;

the dedicated hardware control processing facility comprising a control execution path dedicated to processing only said control instructions, said control execution path having its own control register file of a first bit width for handling control instructions of a first bit width and functional units comprising a branch unit, a hardware execution unit, and a load/store unit;

a dedicated hardware data processing facility dedicated to processing said data processing instructions, said dedicated data processing facility separate from said dedicated control processing facility and having its own data register file separate from said control register, said data register file having a second bit width for handling data processing instructions of a second bit width, said second bit width wider than the first bit width, said dedicated data processing facility comprising a first data execution path including fixed operators and a second data execution path including at least configurable operators and a controller, both of said first and second data execution paths separate from said control execution path and each other, wherein said configurable operators are pre-configured into a plurality of hardwired operator classes and arranged to receive configuration information which determines the nature of the operations to be performed; and a control map associated with said configurable operators of the second execution path, said control map being operable to receive at least one configuration bit from a configurable data processing instruction and to provide configuration information to the configurable operators responsive thereto;

wherein said decode unit is operable to supply one of said control instructions to one of said functional units and operable to detect whether one of said data processing instructions defines a fixed data processing instruction or said configurable data processing instruction, wherein said configurable data processing instruction indicates at least one operand to be processed and includes an opcode portion defining the operation to be carried out on the at least one operand, said decode unit causing the computer processor to supply said one of said data processing instructions to said first data execution path for processing when said fixed data processing instruction is detected and to said second data execution path for processing when said configurable data processing instruction is detected; and wherein said controller is operable to configure the connectivity of said configurable operators in accordance with said configuration information provided in the opcode portion of said configurable data processing instruction, and wherein said configurable operators are arranged to receive said at least one operand.

* * * * *

UNITED STATES PATENT AND TRADEMARK OFFICE
CERTIFICATE OF CORRECTION

| | | |
|---|---|---|
| PATENT NO. | : 8,484,441 B2 | Page 1 of 1 |
| APPLICATION NO. | : 10/813433 | |
| DATED | : July 9, 2013 | |
| INVENTOR(S) | : Simon Knowles | |

It is certified that error appears in the above-identified patent and that said Letters Patent is hereby corrected as shown below:

In the Claims:

Column 10, line 46, after the word "path" please delete the word "is" and insert the word --are--

Signed and Sealed this
Seventeenth Day of September, 2013

Teresa Stanek Rea
*Deputy Director of the United States Patent and Trademark Office*